United States Patent
Gocho

(10) Patent No.: US 10,520,981 B2
(45) Date of Patent: Dec. 31, 2019

(54) CASE FOR AN ELECTRONIC DEVICE

(71) Applicant: TOSHIBA TEC KABUSHIKI KAISHA, Tokyo (JP)

(72) Inventor: Katsumi Gocho, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/374,963

(22) Filed: Apr. 4, 2019

(65) Prior Publication Data
US 2019/0324500 A1    Oct. 24, 2019

(30) Foreign Application Priority Data

Apr. 20, 2018 (JP) .................. 2018-081611

(51) Int. Cl.
*G06F 1/16* (2006.01)
*H04M 1/02* (2006.01)

(52) U.S. Cl.
CPC .......... *G06F 1/1632* (2013.01); *G06F 1/1626* (2013.01); *H04M 1/0202* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,057,676 A * | 10/1991 | Komaki | ................ | G06F 1/1632 235/375 |
| 5,233,502 A * | 8/1993 | Beatty | ..................... | G06F 1/162 248/558 |
| 6,154,759 A * | 11/2000 | Chou | ..................... | G06F 1/1626 361/679.3 |
| 6,426,868 B1 * | 7/2002 | Fullerton | .............. | G06F 1/1632 361/679.08 |
| 6,803,904 B2 * | 10/2004 | Furuki | .................. | G06F 1/1632 345/156 |
| 6,839,002 B2 * | 1/2005 | Olodort | ................. | G06F 3/0221 341/22 |
| 8,310,826 B2 * | 11/2012 | Wu | ....................... | G06F 1/1613 206/320 |
| 8,379,382 B2 * | 2/2013 | Marshall | .............. | F16M 11/041 206/320 |

(Continued)

FOREIGN PATENT DOCUMENTS

JP    4727609 B2    7/2011

*Primary Examiner* — Lisa Lea-Edmonds
(74) *Attorney, Agent, or Firm* — Kim & Stewart LLP

(57) ABSTRACT

A case includes a main body, a cover, and first and second operation units. The main body includes first and second side portions, and a recessed portion between the first and second side portions. The second side portion is positionable at a first position at which a longitudinal end is aligned with a first longitudinal end of the first side portion and at a second position at which the longitudinal end is aligned with a second longitudinal end of the first side portion. The recessed portion is configured to receive, therein, a portable electronic device. The cover is rotatably attached to the first side portion. The first operation unit is on a surface of the cover that faces the front surface of the portable electronic device when the cover is at the closed position. The second operation unit is on an outer surface of the second side portion.

20 Claims, 8 Drawing Sheets

(56) References Cited

U.S. PATENT DOCUMENTS

| | | | |
|---|---|---|---|
| 8,467,178 B2* | 6/2013 | Probst | G06F 1/1616 |
| | | | 345/168 |
| 8,467,179 B2* | 6/2013 | Probst | G06F 1/1616 |
| | | | 345/168 |
| 8,472,168 B2* | 6/2013 | Su | G06F 1/1626 |
| | | | 361/679.01 |
| 8,934,232 B2* | 1/2015 | Hsu | G06F 1/1626 |
| | | | 248/919 |
| 2002/0080567 A1* | 6/2002 | Bone | G06F 1/1626 |
| | | | 361/679.3 |
| 2003/0201970 A1* | 10/2003 | Liu | G06F 1/1626 |
| | | | 345/156 |
| 2004/0212954 A1* | 10/2004 | Ulla | G06F 1/1626 |
| | | | 361/679.09 |
| 2007/0153456 A1* | 7/2007 | Lin | G06F 1/1616 |
| | | | 361/679.04 |
| 2008/0273297 A1* | 11/2008 | Kumar | G06F 1/1616 |
| | | | 361/679.27 |
| 2011/0037701 A1* | 2/2011 | Wang | G06F 1/1632 |
| | | | 345/169 |
| 2011/0096513 A1* | 4/2011 | Kim | G06F 1/1626 |
| | | | 361/747 |
| 2011/0222238 A1* | 9/2011 | Staats | G06F 1/1632 |
| | | | 361/679.55 |
| 2011/0267757 A1* | 11/2011 | Probst | G06F 1/1616 |
| | | | 361/679.09 |
| 2012/0162908 A1* | 6/2012 | Lo | G06F 1/1616 |
| | | | 361/679.55 |
| 2013/0242490 A1* | 9/2013 | Ku | G06F 1/1626 |
| | | | 361/679.3 |

* cited by examiner

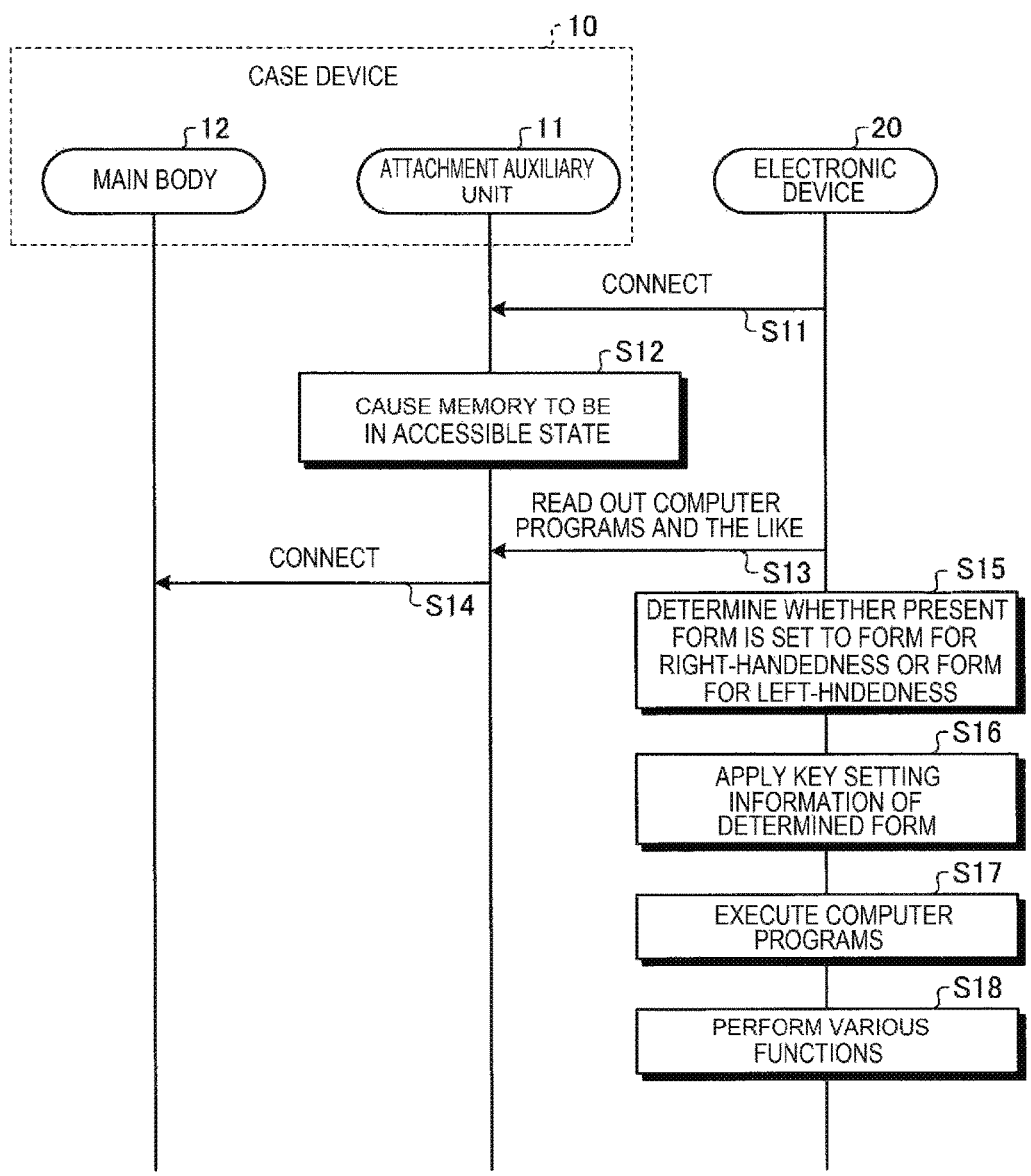

CASE FOR AN ELECTRONIC DEVICE

CROSS-REFERENCE TO RELATED APPLICATION

This application is based upon and claims the benefit of priority from Japanese Patent Application No. 2018-081611, filed on Apr. 20, 2018, the entire contents of which are incorporated herein by reference.

FIELD

An embodiments described herein relate generally to a case for an electronic device.

BACKGROUND

A terminal dedicated for inputting information relating to an order from a food menu is used in a restaurant and the like. The terminal is generally a portable type and is called as a handy terminal. The handy terminal includes, for example, a main body having a display and an openable cover coupled to the main body via a hinge. Various operation keys for an order entry job are exposed if the cover is open. In some handy terminal, the operation keys for the order entry job are provided on a side surface of the main body.

The handy terminal is designed generally for a right-handed person. Specifically, such a handy terminal is designed such that the cover is open toward the right direction in a state in which the main body is held by the left hand. The operation keys on the side surface of the main body are provided at a position at which the operation keys can be operated by the thumb of the left hand.

There is a handy terminal that can be used in a state in which the top and the bottom of the handy terminal are reversed in order to allow a left-handed operator to use the handy terminal. In such a handy terminal, the operation keys are provided at a center in the longitudinal direction of the side surface or operation keys for right-handedness and left-handedness are provided at positions apart from each other so that an operator can operate the operation keys on the side surface of the main body irrespective of a dominant hand.

However, in an arrangement in which the operation keys are provided at the center in the longitudinal direction, if the operator's thumb is on an area in which the operation keys are provided, the operator may need to hold a portion of a half or less length of the main body in the longitudinal direction thereof to hold the main body. Therefore, the operator may need to operate the handy terminal in an unstable state. In an arrangement in which the operation keys for right-handedness and left-handedness are individually provided, the operation keys for one of right-handedness and left-handedness may be unnecessary in an actual use. Therefore, such a dual arrangement is not cost-efficient.

On the other hand, recently, a general-purpose portable electronic device such as a smartphone in which an application software for the order entry job is installed may be used as the handy terminal. In this case, operation is received only through a touch panel. Moreover, a display of the portable electronic device is smaller than that of the known handy terminal. The number of keys displayable on the display may be limited compared with the known handy terminal. Therefore, menus may be displayed in multiple layers. Screens may be often switched and thus operation may be complicated compared with the known handy terminal. As the result, a time required for servicing a customer tends to be long.

DESCRIPTION OF THE DRAWINGS

FIG. 8 is a sequence chart illustrating operations of the case and the electronic device.

DETAILED DESCRIPTION

A case includes a main body, a cover, a first operation unit, and a second operation unit. The main body includes a first side portion, a second side portion, and a recessed portion between the first and second side portions. The second side portion is positionable at a first position at which a longitudinal end of the second side portion is aligned with a first longitudinal end of the first side portion and at a second position at which the longitudinal end of the second side portion is aligned with a second longitudinal end of the first side portion. The recessed portion is configured to receive, therein, a portable electronic device having a display screen on a front surface thereof, such that the display screen is exposed. The cover is rotatably attached to the first side portion of the main body and configured to cover the front surface of the portable electronic device in the recessed portion when the cover is at a closed position. The first operation unit is on a surface of the cover that faces the front surface of the portable electronic device in the recessed portion when the cover is at the closed position. The first operation unit is configured to cause a first operation signal corresponding to a first user operation of the first operation unit to be transmitted to the portable electronic device. The second operation unit is on an outer surface of the second side portion. The second operation unit configured to cause a second operation signal corresponding to a second user operation of the second operation unit to be transmitted to the portable electronic device.

A case of an electronic device according to an embodiment is described below with reference to the accompanying drawings. In the embodiment described below, the case is used for an order entry job in an eating place such as a restaurant (hereinafter more generally referred to as a store).

Figure 1:
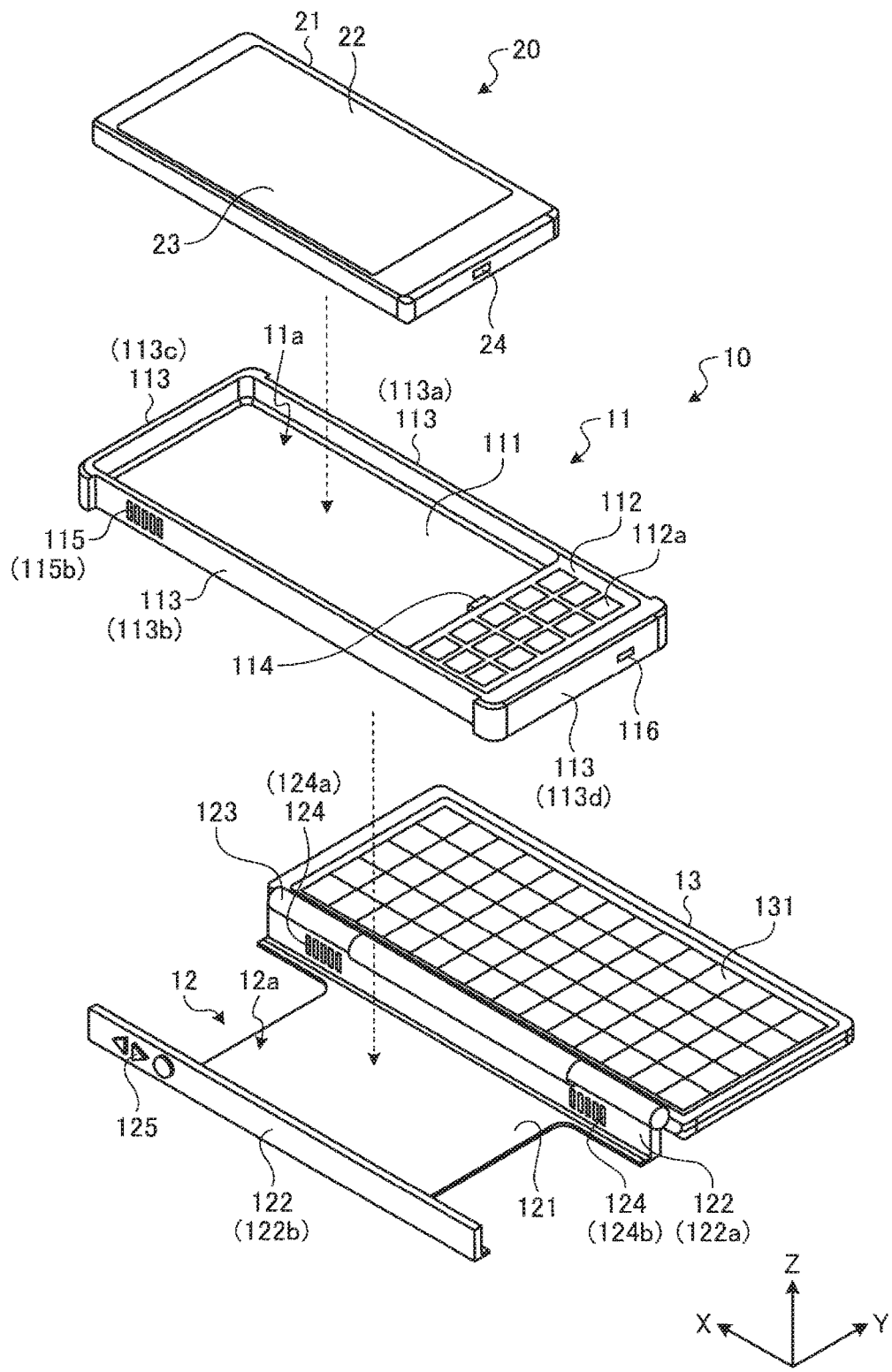
FIG. 1 is a diagram illustrating a case according to an embodiment.

FIG. 1 is a diagram illustrating a case 10 according to an embodiment. In FIG. 1, an electronic device 20 is a portable electronic device such as a smartphone or a tablet terminal. The electronic device 20 may be an electronic device carried by an employee of a store for a personal use or may be an electronic device distributed to employees from the store.

The electronic device 20 includes a substantially rectangular housing 21, a display 22, a touchpad 23, and an external connection terminal 24. The display 22 is, for example, an LCD (Liquid Crystal Display). The display 22 is disposed on the front surface of the electronic device 20 to display various kinds of information. The touchpad 23 is, for example, a touch panel composed of a capacitance-type touch sensor. The touchpad 23 is disposed over the surface of the display 22. The touchpad 23 detects an operation position of a finger on a display screen of the display 22.

The external connection terminal 24 is, for example, a micro USB (Universal Serial Bus) and is provided on a side surface of the electronic device 20. The electronic device 20 is electrically connected to an external device (e.g., case 10) via the external connection terminal 24.

The case 10 is an example of a case for the electronic device 20. The case 10 includes an attachment auxiliary unit 11, a main body 12, and a cover 13.

The attachment auxiliary unit 11 is an auxiliary member for attaching the electronic device 20 to the main body 12. The attachment auxiliary unit 11 has a thin box shape capable of fitting in a recessed section 12a of the main body 12. The attachment auxiliary unit 11 includes a bottom surface section 111, an operation unit 112, and a peripheral wall section 113.

The bottom surface section 111 has a substantially rectangular shape corresponding to the shape of the electronic device 20. The bottom surface section 111 is opposed to the rear surface of the electronic device 20 in a state in which the electronic device 20 is received in the case 10.

The operation unit 112 has a height approximately the same as the thickness of the electronic device 20. The operation unit 112 is disposed at the side of one of short sides forming the bottom surface section 111. Front keys 112a are provided on the front surface of the operation unit 112. The front keys 112a are an example of a third operation unit. The front keys 112a include operation keys such as a ten key. The front keys 112a input an electric signal corresponding to an operation by a user to the electronic device 20.

Figure 2A:
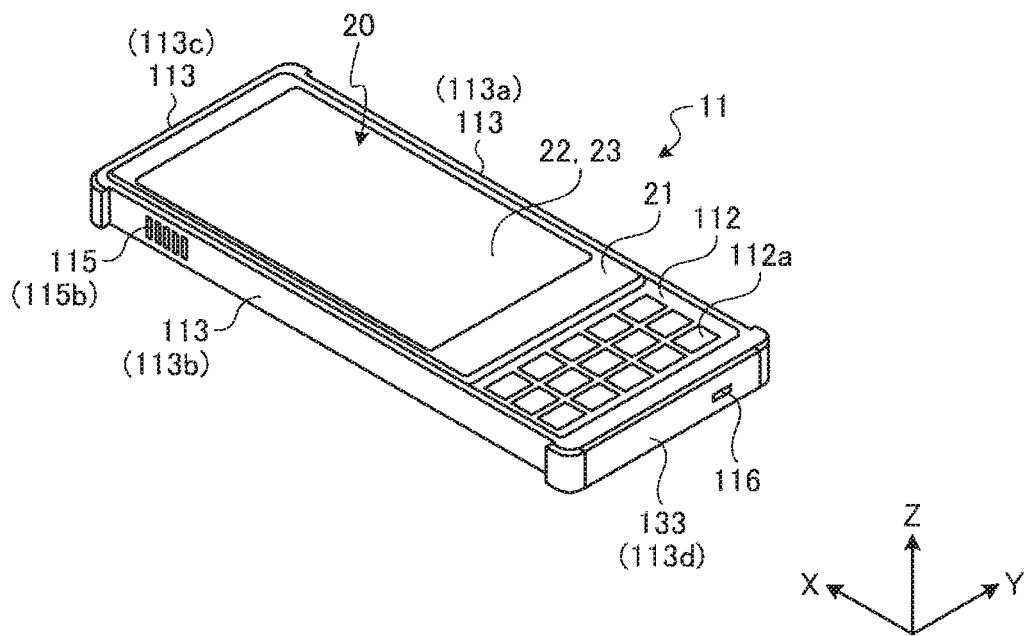
FIGS. 2A and 2B are diagrams illustrating a state of the case in which an electronic device is attached to an attachment auxiliary unit illustrated in FIG. 1.
Figure 2B:
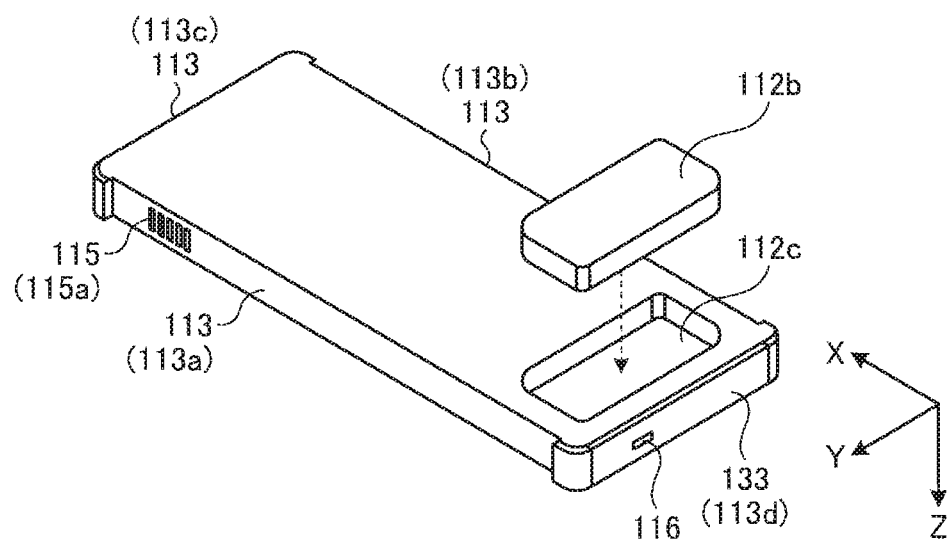

A recessed section 112c in which a battery pack 112b is receivable is provided at the rear surface of the operation unit 112 (see FIG. 2B). The battery pack 112b is a power supply to the case 10 or the electronic device 20. The battery pack 112b is fit in the recessed section 112c to be electrically connected to a terminal (not illustrated in FIG. 1) provided in the recessed section 112c.

The peripheral wall section 113 is erected at the peripheral edge of the bottom surface section 111 and the operation unit 112. The peripheral wall section 113 has a height corresponding to the thickness of the electronic device 20. In more detail, the peripheral wall section 113 is composed of a right wall section 113a and a left wall section 113b of long side portions and an upper wall section 113c and a lower wall section 113d of short side portions in four sides surrounding the bottom surface section 111 and the operation unit 112. Both end portions of the upper wall section 113c and the lower wall section 113d have shapes projecting from the right wall section 113a and the left wall section 113b. In other words, the outer side surfaces of the right wall section 113a and the left wall section 113b are formed at positions further recessed than the end portions of the upper wall section 113c and the lower wall section 113d. The shapes of corners at both end portions of the upper wall section 113c and the lower wall section 113d are desirably formed as curved surfaces.

The attachment auxiliary unit 11 includes a first terminal 114 at a position, on a surface contacting with the electronic device 20, corresponding to the external connection terminal 24 of the electronic device 20. Hereinafter, a terminal may be referred to as a connection interface. In FIG. 1, the first terminal 114 is provided on the inner wall surface of the operation unit 112. The first terminal 114 has a shape corresponding to the external connection terminal 24. The first terminal 114 is electrically connected to the external connection terminal 24 of the electronic device 20 if the electronic device 20 is received in the attachment auxiliary unit 11. The first terminal 114 is electrically connected to second terminals 115 and a power-supply connecting section 116 described below via wires and electric circuits not shown in FIG. 1.

The attachment auxiliary unit 11 includes the second terminals 115 on the outer wall surface of the peripheral wall section 113. The second terminals 115 are terminals for electrically connecting the attachment auxiliary unit 11 and the main body 12. Specifically, the attachment auxiliary unit 11 includes a second terminal 115a on the outer wall surface of the right wall section 113a (see FIG. 2B) and a second terminal 115b on the outer wall surface of the left wall section 113b. The second terminals 115a and 115b are provided at positions close to one end portion side common to the second terminals 115a and 115b in the longitudinal direction of the attachment auxiliary unit 11 (right wall section 113a and left wall section 113b). That is, the second terminals 115a and 115b are provided at positions opposed to each other on the outer wall surfaces of the right wall section 113a and the left wall section 113b.

The attachment auxiliary unit 11 further includes a power-supply connecting section 116 on the outer wall surface of the lower wall section 113d. The power-supply connecting section 116 includes a connector for power reception. The power-supply connecting section 116 is connected to an external power supply via a cable (not shown). Electric power received via the power-supply connecting section 116 is used for charging the battery pack 112b and also used as a driving power for the case 10 and the electronic device 20.

In the attachment auxiliary unit 11 having the constitution described above, in a state in which a display screen of the electronic device 20 is exposed, a user such as an employee fits the electronic device 20 in a recessed section 11a formed by the bottom surface section 111, the operation unit 112, and the peripheral wall section 113 of the attachment auxiliary unit 11. Consequently, the electronic device 20 is held with the attachment auxiliary unit 11 in a detachable state.

FIGS. 2A and 2B are diagrams illustrating a state of the electronic device 20 in which the electronic device 20 is attached to the attachment auxiliary unit 11. FIG. 2A illustrates a perspective view of the electronic device 20 including the front side of the attachment auxiliary unit 11 in which the electronic device 20 is received. FIG. 2B illustrates a perspective view of the electronic device 20 including the rear side of the attachment auxiliary unit 11 and the battery pack 112b removed therefrom.

As illustrated in FIGS. 2A and 2B, the operation unit 112 and the peripheral wall section 113 of the attachment auxiliary unit 11 support the electronic device 20 fit in the recessed section 11a with the side-walls. If the electronic device 20 is received in the attachment auxiliary unit 11, the external connection terminal 24 and the first terminal 114 are connected, and thus the electronic device 20 and the attachment auxiliary unit 11 are electrically connected. Consequently, for example, an operation signal of the front keys 112a can be input to the electronic device 20. Electric power of the external power supply or the battery pack 112b can be supplied to the electronic device 20.

In the attachment auxiliary unit 11, the up-down (top-bottom) direction is the longitudinal direction of the attachment auxiliary unit 11 (X direction in FIGS. 2A and 2B). The left-right direction is the latitudinal direction of the attachment auxiliary unit 11 (Y direction in FIGS. 2A and 2B). In the up-down direction of the attachment auxiliary unit 11, the upper wall section 113c side is an upward direction and the lower wall section 113d side is a downward direction. The operation unit 112 is disposed at a position in the downward direction of the electronic device 20 (display 22). With the arrangement described above, if the user grasps the case 10 (attachment auxiliary unit 11), the user can easily perform operation of the front keys 112a.

Coordinate axes illustrated in FIGS. 2A and 2B indicate the up-down direction (X-axis direction), the left-right direction (Y-axis direction), and the height direction (Z-axis direction) on the basis of the lower left corner portion of the attachment auxiliary unit 11 (left end portion of the lower wall section 113d). The same applies to coordinate axes illustrated in the other drawings.

Referring back to FIG. 1, the main body 12 includes a bottom surface section 121 and a side surface section 122. The main body 12 detachably holds the attachment auxiliary unit 11 with the recessed section 12a formed with the bottom surface section 121 and the side surface section 122.

The bottom surface section 121 has a size corresponding to the attachment auxiliary unit 11. The bottom surface section 121 is opposed to the rear surface of the attachment auxiliary unit 11. The bottom surface section 121 has a substantially H-like shape gouged at both end portions in the longitudinal direction thereof. In a state in which the attachment auxiliary unit 11 is attached, such gouged portions correspond to the position of the recessed section 112c provided on the rear surface of the attachment auxiliary unit 11 and expose the entire region of the recessed section 112c (see FIG. 6A and FIG. 6B).

The side surface section 122 is erected on a side portion (long side portion) in the longitudinal direction of the bottom surface section 121. The side surface section 122 has the same degree of height as the attachment auxiliary unit 11 (peripheral wall section 113). In more detail, the side surface section 122 is composed of a first side surface section 122a at a side to which the cover 13 is connected and a second side surface section 122b opposed to the first side surface section 122a.

The length in the longitudinal direction of the first side surface section 122a and the second side surface section 122b is substantially equal to the length in the longitudinal direction of the right wall section 113a and the left wall section 113b of the attachment auxiliary unit 11. If the attachment auxiliary unit 11 is fit in the recessed section 12a, the first side surface section 122a and the second side surface section 122b engage with concave portions of the peripheral wall section 113 (right wall section 113a and left wall section 113b) of the attachment auxiliary unit 11 to support the attachment auxiliary unit 11 from the both sides.

The thickness of the first side surface section 122a and the second side surface section 122b is desirably set to a value corresponding to a difference in height between the outer wall surfaces of the right wall section 113a and the left wall section 113b of the attachment auxiliary unit 11 and the end portions of the upper wall section 113c and the lower wall section 113d. Consequently, if the attachment auxiliary unit 11 and the main body 12 are integrated, the upper wall section 113c and the lower wall section 113d of the attachment auxiliary unit 11 can be smoothly connected with the first side surface section 122a and the second side surface section 122b, respectively.

In the main body 12, the up-down (top-bottom) direction is the longitudinal direction of the main body 12 (X direction in FIG. 1) and the left-right direction is the transverse direction of the main body 12 (Y direction in FIG. 1). In the up-down direction of the main body 12, the upward direction and the downward direction (top and bottom) are equivalent to the directions of the attachment auxiliary unit 11 attached to the main body 12.

The main body 12 includes a turn supporting section 123 at the upper end portion of the first side surface section 122a, away from the bottom surface section 121 in the thickness direction of the main body 12 (Z direction). The turn supporting section 123 is, for example, a hinge.

The main body 12 further includes third terminals 124 (124a and 124b) on the inner wall surface of the first side surface section 122a, that is, at a surface side contacting with the attachment auxiliary unit 11. The third terminals 124 are terminals for electrically connecting the attachment auxiliary unit 11 and the main body 12. The third terminals 124 are provided at positions corresponding to the second terminals 115 of the attachment auxiliary unit 11 if the attachment auxiliary unit 11 is received in the main body 12. In more detail, the third terminals 124 are provided at positions respectively corresponding to the second terminal 115a and the second terminal 115b before and after the top and the bottom of the attachment auxiliary unit 11 are reversed. The third terminals 124 are electrically connected to a keypad 131 of the cover 13 via wires and electric circuits (not shown).

On the other hand, the second side surface section 122b is a part contacting with the thumb if the user grasps the case 10 (main body 12) with the hand opposite to the dominant hand. The second side surface section 122b includes a side key 125 operable by the thumb on the outer wall surface thereof. The side key 125 is an example of a second operation unit. The side key 125 includes various operation keys such as direction keys for instructing the up-down direction and a confirmation key relating to an order entry job. The side key 125 inputs an electric signal corresponding to an operation by a user to the electronic device 20. The side key 125 is provided at a position close to one of the end portions from the center in the longitudinal direction of the second side surface section 122b.

Figure 3A:
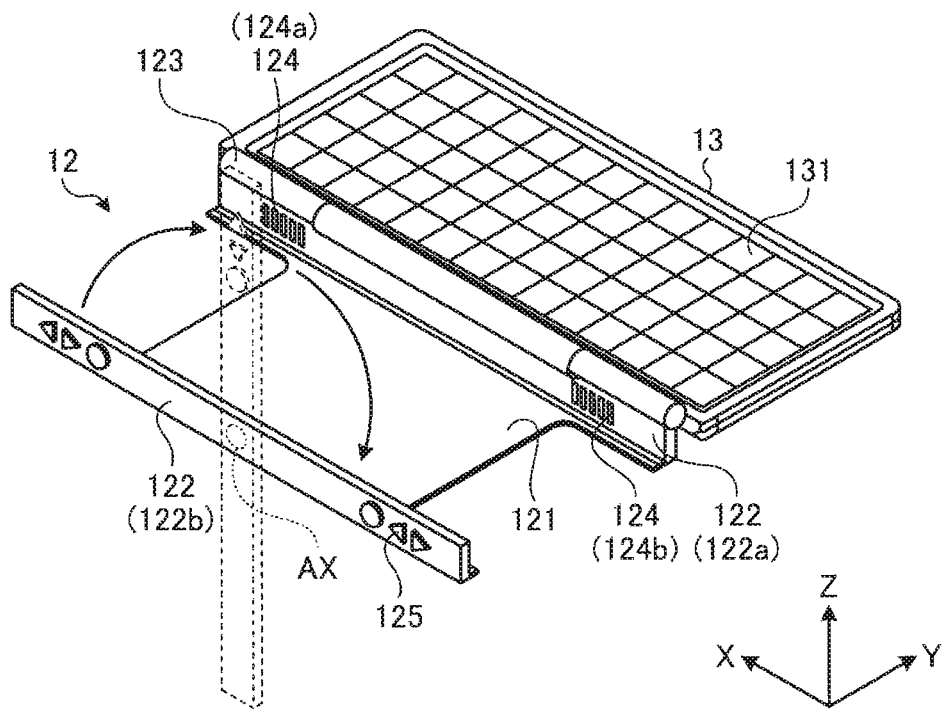
FIGS. 3A and 3B are diagrams illustrating an attachment structure of a second sidewall section illustrated in FIG. 1.
Figure 3B:
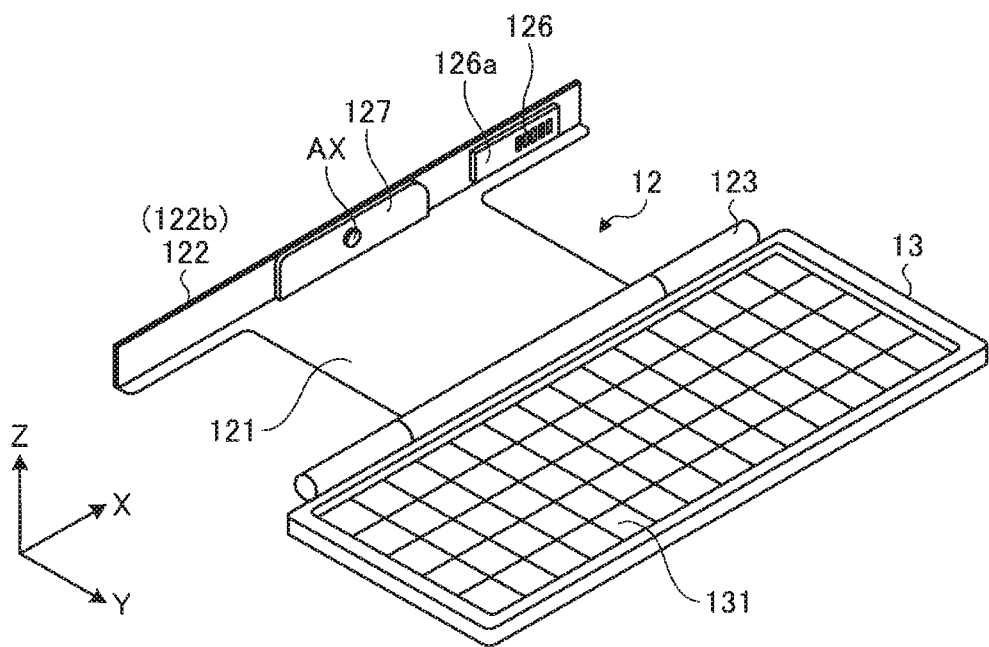

The second side surface section 122b includes a fourth terminal 126 on the inner wall surface thereof (see FIG. 3B). The fourth terminal 126 is a terminal for electrically connecting the attachment auxiliary unit 11 and the main body 12. The fourth terminal 126 is provided at a position corresponding to the second terminal 115 of the attachment auxiliary unit 11 if the attachment auxiliary unit 11 is attached to the main body 12. The fourth terminal 126 is electrically connected to the side key 125 via a wire and an electric circuit (not shown).

The second side surface section 122b is attached to the main body 12 to enable the positions of both end portions in the longitudinal direction of the second side surface section 122b to be interchanged. Attachment structure of the second side surface section 122b is described below with reference to FIGS. 3A and 3B.

FIGS. 3A and 3B are diagrams illustrating the attachment structure of the second side surface section 122b. FIG. 3A illustrates a perspective view of the main body 12 and the cover 13 viewed from the outer wall side of the second side surface section 122b. FIG. 3B illustrates a perspective view of the main body 12 and the cover 13 viewed from the inner wall side of the second side surface section 122b. Coordinate axes illustrated in FIGS. 3A and 3B have relation the same as that between the main body 12 and the cover 13, and the coordinate axes illustrated in FIG. 1.

As illustrated in FIGS. 3A and 3B, the second side surface section 122b includes a rotation axis AX in the center of the second side surface section 122b (center in the longitudinal direction and the transverse direction). The rotation axis AX is axially supported by a convex supporting section 127 erected from the bottom surface section 121. As illustrated in FIG. 3A, the second side surface section 122b is capable of rotating around the rotation axis AX. The positions of both end portions of the second side surface section 122b can be interchanged by rotating one of the end portions in the longitudinal direction toward the other end portion. Consequently, in the second side surface section 122b, the position of the side key 125 (and the fourth terminal 126) on the side surface of the case 10 can be interchanged with respect to the rotation axis AX.

The main body 12 may include a mechanism such as a stopper so that the second side surface section 122b can be held at a position parallel to the bottom surface section 121. For example, in FIGS. 3A and 3B, a part 126a on the inner wall surface of the second side surface section 122b, on which the fourth terminal 126 is provided, is formed in a convex shape projecting toward the first side surface section 122a. The part 126a has the same degree in thickness as the supporting section 127. The part 126a comes into contact with the bottom surface section 121 if the second side surface section 122b is rotated. The part 126a functions as a stopper for holding the second side surface section 122b at a position parallel to the bottom surface section 121 to limit a rotation (turning) range of the second side surface section 122b to 180 degrees.

The cover 13 has a generally flat and substantially rectangular shape. The cover 13 is rotatably coupled to the main body 12 via the turn supporting section 123. In more detail, the cover 13 is coupled to the main body 12 to be capable of moving (turning) between a first position at which the cover 13 locates on the front surface of the main body 12 in a stacked state to cover the front surface of the main body 12 and a second position at which the cover 13 locates side by side with the main body 12 to expose the front surface of the main body 12. In other words, the cover 13 is arranged to be capable of opening and closing the front surface of the main body 12 (attachment auxiliary unit 11 and electronic device 20).

The cover 13 includes a keypad 131 for data input on a surface (inner side surface) opposed to the front surface of the main body 12. The keypad 131 is an example of a first operation unit. The keypad 131 includes various operation keys relating to the order entry job such as a ten key for inputting a numerical value, a menu key for selecting a menu, and an option key for selecting a topping item and the like. The keypad 131 inputs an electric signal corresponding to an operation by the user to the electronic device 20.

The keypad 131 includes a functional sheet and a transparent cover. The functional sheet has a surface on which function names and the like of the operation keys are written corresponding to an array (arrangement) of the operation keys. The functional sheet is sandwiched between the transparent cover and the operation keys. The transparent cover is openable and closable. The functional sheet can be replaced by opening the transparent cover.

A plurality of operation keys included in the keypad 131 are disposed in a matrix form and symmetrical with respect to the center in the longitudinal direction of the cover 13 and the electronic device 20. With the arrangement described above, even if the top and the bottom of the cover 13 are reversed in order to properly use the keypad 131 for right-handedness and left-handedness, the operation keys of the keypad 131 can be used in common. Note that the functional sheet can be used for both of right-handedness and left-handedness by putting the functional sheet between the transparent cover and the operation keys again in a state in which the functional sheet is rotated by 180° (degrees). For example, if the functional sheet used for right-handedness is used for left-handedness (or vice versa), the user first opens the transparent cover of the keypad 131 and then takes the functional sheet out of the keypad 131, rotates the functional sheet 180° to turn the functional sheet upside down, and inserts the functional sheet between the transparent cover and the operation keys again.

The cover 13 covers the front surface of the attachment auxiliary unit 11 (front surface of electronic device 20) in a closed state. The user can perform operation on the keypad 131 by turning the cover 13 to an open state.

The operation on the keypad 131 and the side key 125 may be enabled when the cover 13 is in the open state. In this case, for example, an opening/closing sensor for detecting the open/closed state of the cover 13 may be provided in the main body 12 to switch enabling/disabling of the operation according to a detection result of the opening/closing sensor.

The arrangement of the operation keys is not limited to the matrix form and may be, for example, point-symmetry with respect to the center of the keypad 131. In this case as well, the functional sheet can be used for both of right-handedness and left-handedness by putting the functional sheet between the transparent cover and the operation keys again in a state in which the functional sheet is rotated by 180°.

In the main body 12 described above, the user fits, in a direction corresponding to the dominant hand of the user, the attachment auxiliary unit 11, in which the electronic device 20 is received, in the recessed section 12a formed with the bottom surface section 121 and the side surface section 122. Consequently, the main body 12 detachably holds the electronic device 20 via the attachment auxiliary unit 11.

Figure 4A:
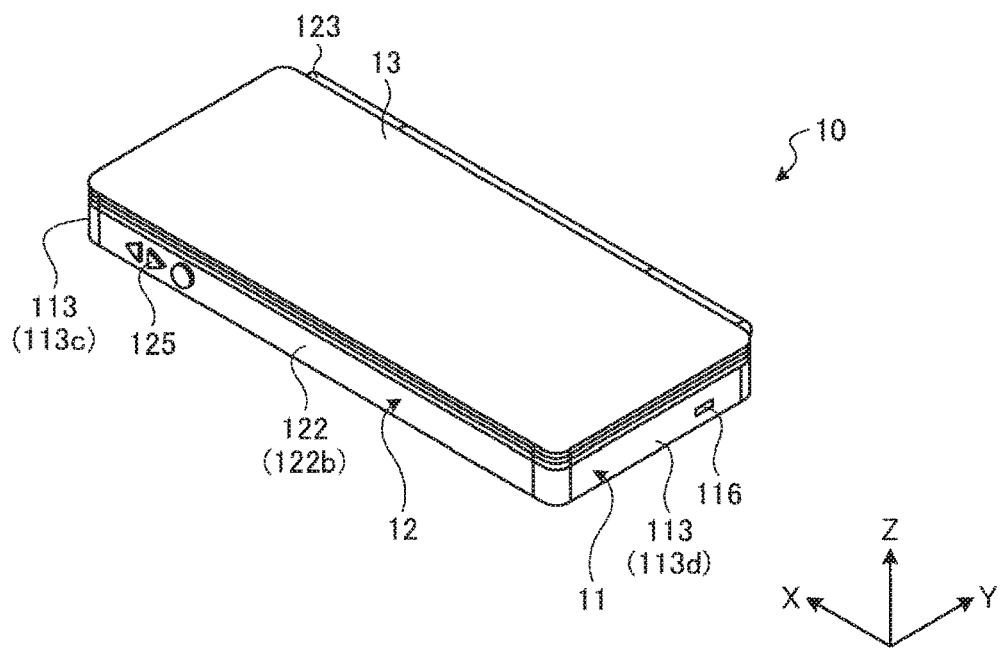
FIGS. 4A and 4B are diagrams illustrating the case when the case is set in a form for right-handedness.
Figure 4B:
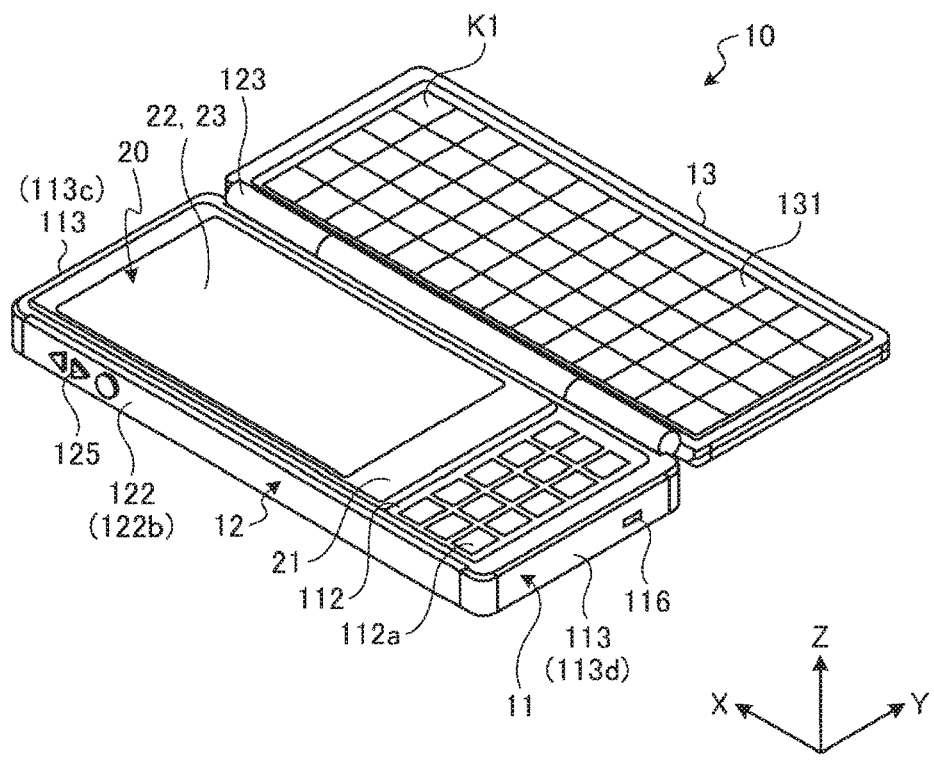
Figure 5A:
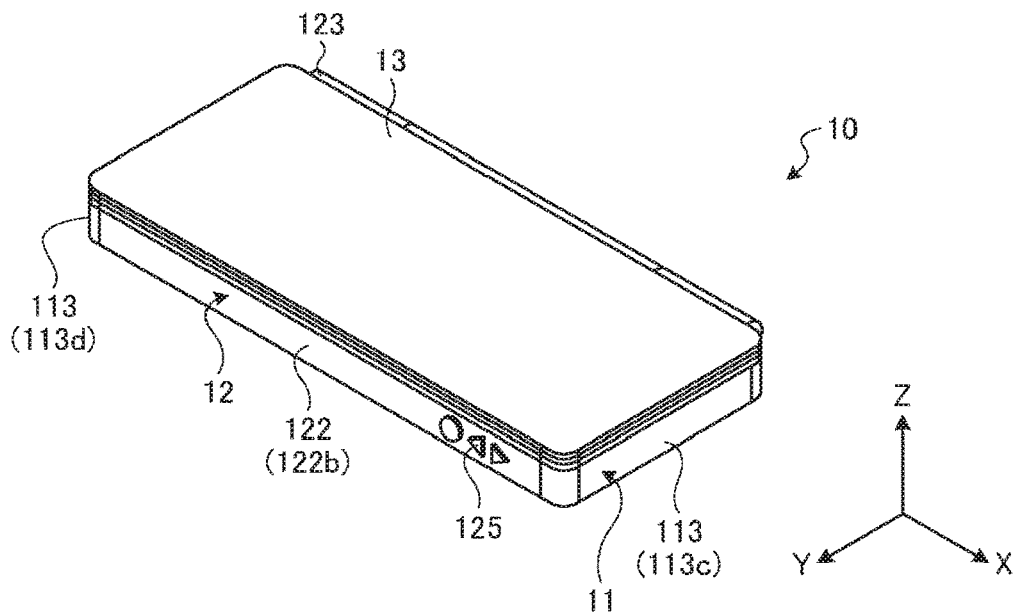
FIGS. 5A and 5B are diagrams illustrating the case when the case is set in a form for left-handedness.
Figure 5B:
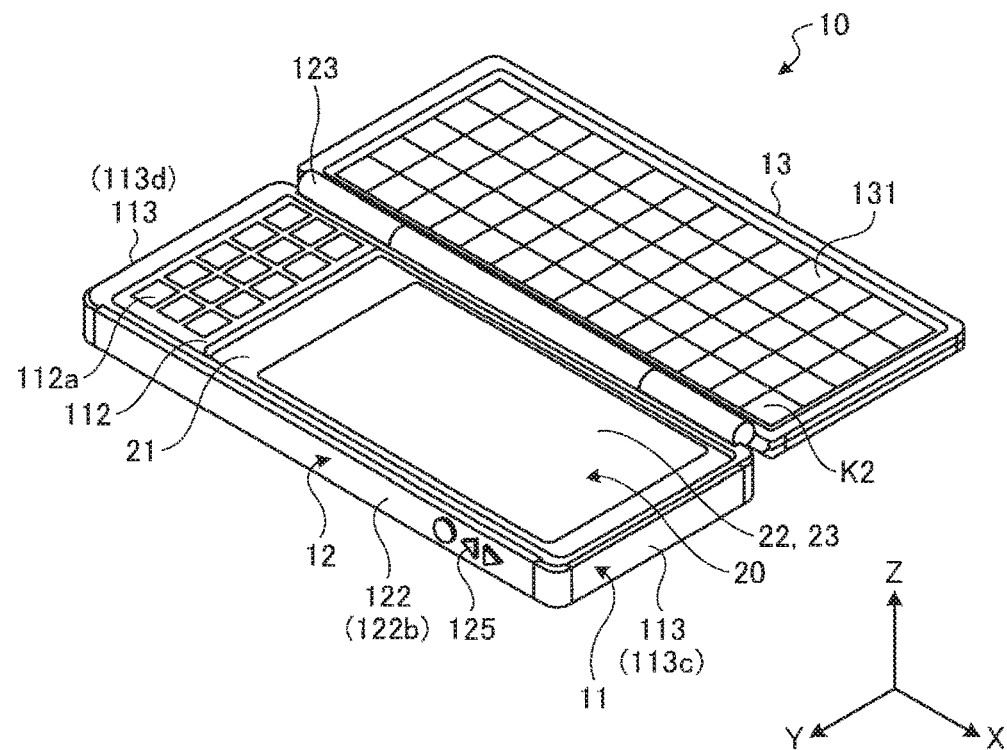
Figure 6A:
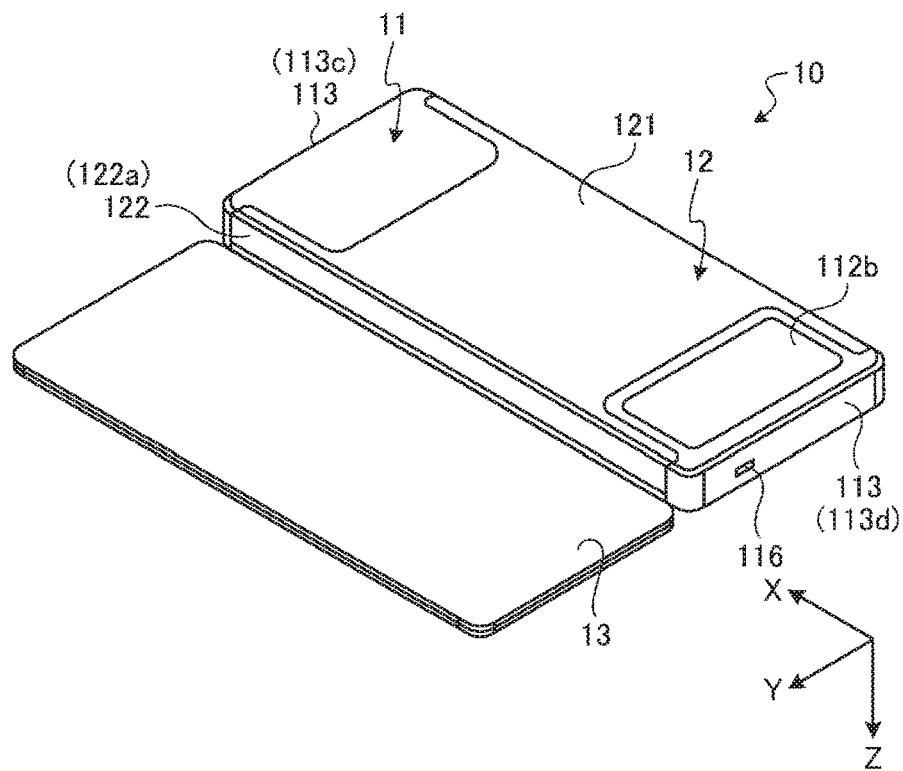
FIGS. 6A and 6B are diagrams illustrating the rear surface of the case.
Figure 6B:
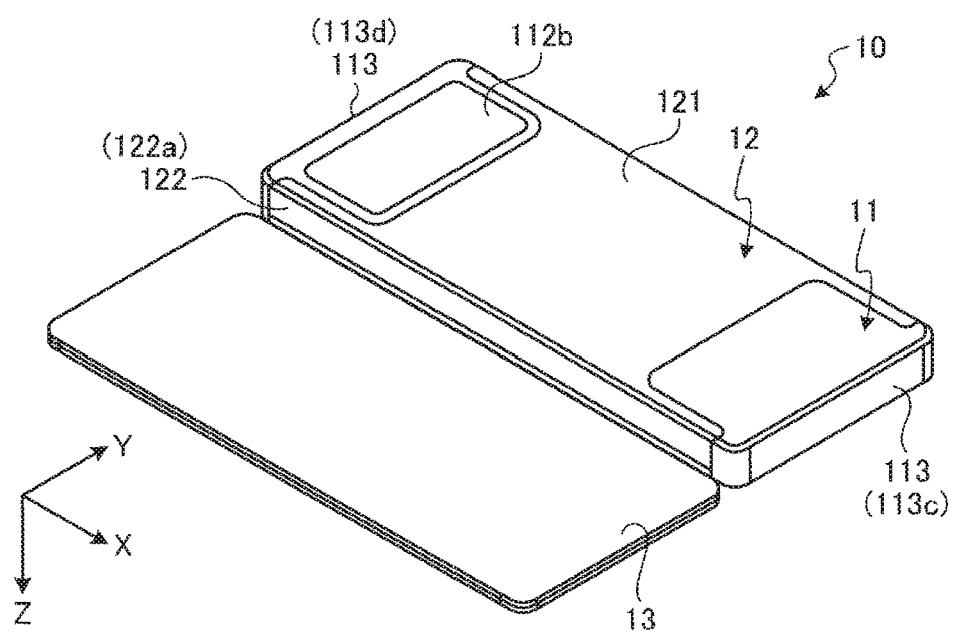

FIGS. 4A and 4B are diagrams illustrating the case 10 set in a form for right-handedness. FIG. 4A illustrates a state of the case 10 in which the cover 13 is closed (closed state). FIG. 4B illustrates a state of the case 10 in which the cover 13 is opened (open state). FIGS. 5A and 5B are diagrams illustrating the case 10 set in a form for left-handedness. FIG. 5A illustrates the state of the case 10 in which the cover 13 is closed (closed state). FIG. 5B illustrates the state of the case 10 in which the cover 13 is opened (open state). FIGS. 6A and 6B are diagrams illustrating the rear surface of the cover 13. FIG. 6A shows the rear surface of the case 10 set in the form for right-handedness. FIG. 6B shows the rear surface of the case 10 set in the form for left-handedness.

If the case 10 is set in the form for right-handedness, the case 10 is disposed such that the cover 13 is disposed at the right side of the main body 12. The second side surface section 122b is rotated to locate the side key 125 above the case 10. The attachment auxiliary unit 11, in which the electronic device 20 is received, is fit in the recessed section 12a of the main body 12 in a state in which the display 22 of the electronic device 20 is directed upward. Consequently, the form for right-handedness is achieved.

In the case of the form for right-handedness, the second terminal 115a of the attachment auxiliary unit 11 and the third terminal 124a of the main body 12 are electrically connected by the attachment of the attachment auxiliary unit 11 to the main body 12. The second terminal 115b of the attachment auxiliary unit 11 and the fourth terminal 126 of the main body 12 are electrically connected. Consequently, an operation signal of the keypad 131 can be input to the electronic device 20 through the third terminal 124a, the second terminal 115a, and the first terminal 114. An operation signal of the side key 125 can be input to the electronic device 20 through the fourth terminal 126, the second terminal 115b, and the first terminal 114.

In the form for right-handedness, the user can open and close the cover 13 with the right hand while holding the main body 12 of the case 10 with the left hand. The user can operate the keypad 131 with the right hand by opening the cover 13 while holding the main body 12 of the case 10 with the left hand. The user can operate the side key 125 with the thumb of the hand that is holding the main body 12.

On the other hand, if the case 10 is set in the form for left-handedness, the case 10 is disposed such that the cover 13 is located at the left side of the main body 12. The side key 125 is located above the case 10 by rotating the second side surface section 122b. The attachment auxiliary unit 11, in which the electronic device 20 is received, is fit in the recessed section 12a of the main body 12 in a state in which the display 22 of the electronic device 20 is directed upward. Consequently, the form for left-handedness is achieved.

In the case of the form for left-handedness, the second terminal 115a of the attachment auxiliary unit 11 and the fourth terminal 126 of the main body 12 are electrically connected by the attachment of the attachment auxiliary unit 11 to the main body 12. The second terminal 115b of the attachment auxiliary unit 11 and the third terminal 124b of the main body 12 are electrically connected. Consequently, an operation signal of the keypad 131 can be input to the electronic device 20 through the third terminal 124b, the second terminal 115b, and the first terminal 114. An operation signal of the side key 125 can be input to the electronic device 20 through the fourth terminal 126, the second terminal 115a, and the first terminal 114.

In the form for left-handedness, the user can open and close the cover 13 with the left hand while holding the main body 12 of the case 10 with the right hand. The user can operate the keypad 131 with the left hand by opening the cover 13 while holding the main body 12 of the case 10 with the right hand. The user can operate the side key 125 with the thumb of the hand that is holding the main body 12.

In both of the form for right-handedness and the form for left-handedness, the user operates the side key 125 with the thumb of the hand that is grasping the main body 12. Therefore, the user grasps the main body 12 with the thumb placed at the position of the side key 125. For example, if the side key 125 is disposed at the center of the second side surface section 122b, the position of the side key 125 can be made in common to the form for right-handedness and the form for left-handedness. However, the user grasps the main body 12 at a position of a half or less length of the main body 12 in the longitudinal direction. In this case, the user holds the main body 12 in an unstable state. Therefore, operability of the electronic device 20 and the various keys is likely to be deteriorated.

On the other hand, in the case 10 according to the present embodiment, in both of the form for right-handedness and the form for left-handedness also, the side key 125 can be located above the center in the longitudinal direction of the main body 12. With this arrangement, a large portion (region) of the main body 12 which is grasped can be secured, compared with the arrangement in which the side key 125 is provided at the center of the second side surface section 122b. Therefore, the user can hold the main body 12 in a stable state. Therefore, improvement of operability can be achieved.

Further, the case 10 includes, at both end portions in the longitudinal direction of the bottom surface section 121 of the main body 12, the gouged sections which enable the recessed section 112c provided on the rear surface of the attachment auxiliary unit 11 to be exposed. Consequently, as illustrated in FIGS. 6A and 6B, in both of the form for right-handedness and the form for left-handedness, the battery pack 112b can be easily attached or detached in a state in which the attachment auxiliary unit 11 is received in the main body 12.

Figure 7:
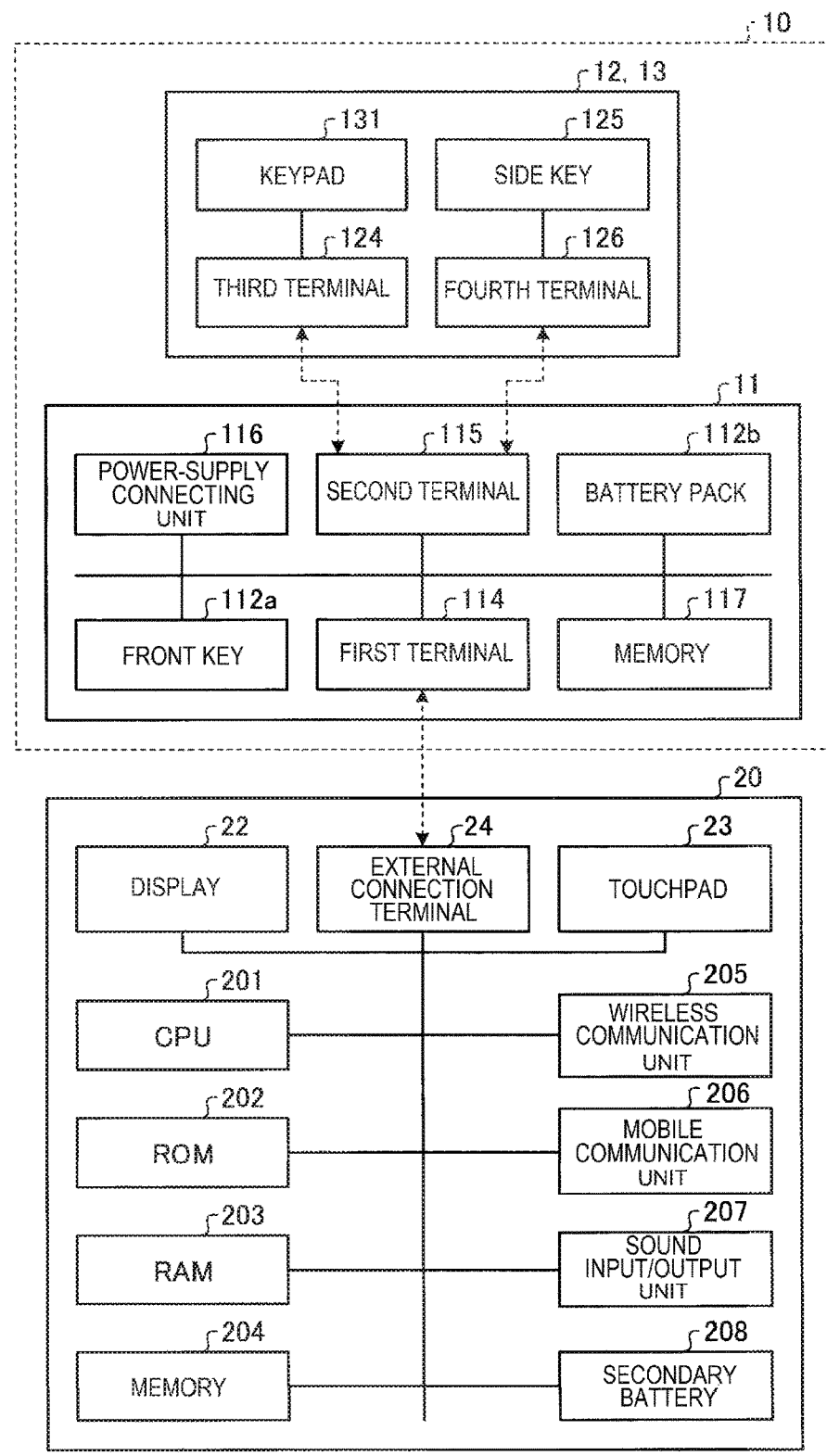
FIG. 7 is a diagram schematically illustrating a hardware structures of the case and the electronic device.

A hardware constitution of the case 10 and the electronic device 20 is described. FIG. 7 is a diagram schematically illustrating the hardware constitution of the case 10 and the electronic device 20.

The attachment auxiliary unit 11 of the case 10 includes memory 117 in addition to the front keys 112a, the first terminal 114, the second terminals 115, the power-supply connecting section 116, and the battery pack 112b. The power-supply connecting section 116 supplies electric power supplied from the external power supply to functional units of the case 10.

The first terminal 114 performs transmission/reception of electric power and various kinds of information with the electronic device 20 electrically connected to the first terminal 114. The first terminal 114 supplies electric power supplied via the power-supply connecting section 116 to functional units of the case 10. Consequently, the electronic device 20 can receive supply of electric power for charging from the external power supply in a state in which the electronic device 20 is received in the case 10.

Further, the first terminal 114 supplies electric power supplied from the battery pack 112b to each functional units of the case 10. Specifically, if the external power supply is not connected to the power-supply connecting section 116, the first terminal 114 supplies the electric power supplied from the battery pack 112b to functional units of the case 10. In the case of a constitution capable of supplying electric power from the electronic device 20, the first terminal 114 may supply the electric power from the electronic device 20 to functional units of the case 10.

The first terminal 114 is connected to the front keys 112a. If receiving key operation on the front keys 112a, the first terminal 114 inputs information corresponding to the key operation to the electronic device 20. The first terminal 114 is also connected to the second terminals 115. If receiving key operation on the side key 125 or the keypad 131 via the second terminals 115, the first terminal 114 inputs information corresponding to the key operation to the electronic device 20.

Further, the first terminal 114 provides application software (computer program), setting information, and the like stored in the memory 117 to the electronic device 20 to enable the electronic device 20 to execute (read out) the applications software, the setting information, and the like.

The memory 117 is incorporated in, for example, the operation unit 112. The memory 117 includes a nonvolatile storage medium such as a flash memory or an SSD (Solid State Drive). The memory 117 stores various data relating to the operation of the case 10 to enable the electronic device 20 connected to the first terminal 114 to read out the various data.

Specifically, the memory 117 stores computer programs to be executed by the electronic device 20 connected to the memory 117. Such computer programs include computer programs described below with which the electronic device 20 received in the case 10 functions as a handy terminal for order entry.

For example, the memory 117 stores a first computer program (driver software) for enabling an operation input by the front keys 112a, the side key 125, and the keypad 131.

The memory 117 stores a second computer program for connecting a wireless communication unit 205 included in the electronic device 20 to a network (hereinafter referred to as an intra-net) such as a LAN (Local Area Network) provided in a store. An order station (not illustrated in FIG. 7) for managing order information is connected to the intra-net.

The memory 117 stores a third computer program with which the electronic device 20 functions as a handy terminal for order entry. Such a computer program has, for example, a function for displaying a GUI (Graphical User Interface) for receiving orders of various menus on the display 22. Such a computer program also has, for example, a function for wirelessly transmitting order information indicating menu input through the operation unit 112, the side key 125, and the keypad 131 to the order station (not illustrated in FIG. 7) via the wireless communication unit 205.

The memory 117 stores a fourth computer program for disabling functions performed by the electronic device 20 in advance. Functions to be disabled are not particularly limited. However, functions unnecessary for the order entry job are desirably set as the functions to be disabled, for example, a mobile communication function.

The memory 117 stores a computer program for allowing the electronic device 20 to adopt a suitable one of kinds of key setting information for the form for right-handedness and the form for left-handedness described below. The electronic device 20 that executes such a computer program determines whether the present form of the case 10 is the form for right-handedness or the form for left-handedness and then adopts the key setting information for the determined form. A method of determining right-handedness and left-handedness is not particularly limited. However, for example, the electronic device 20 may determine whether the present form of the case 10 is the form for right-handedness or the form for left-handedness according to which of the second terminal 115a and the second terminal 115b of the attachment auxiliary unit 11 is connected to the fourth terminal 126 (or third terminals 124). In this case, the electronic device 20 determines that the present form of the case 10 is the form for right-handedness if the second terminal 115b is connected to the fourth terminal 126 and determines that the present form of the case 10 is the form for left-handedness if the second terminal 115a is connected to the fourth terminal 126. A method of determining a connection destination is not particularly limited. However, for example, the electronic device 20 may determine the connection destination on the basis of device IDs set in the terminals or signal waveforms from the keypad 131 and the side key 125.

The memory 117 stores various kinds of setting information relating to execution of each computer program described above. For example, the memory 117 stores setting information relating to the wireless communication such as a password for connection to the intranet and an IP address of the order station (not illustrated in FIG. 7).

The memory 117 further stores setting information in which key arrays of the side key 125 and the keypad 131, functions allocated to the keys, and the like are set. The memory 117 stores two kinds of key setting information for right-handedness and left-handedness as the setting information concerning the key arrays. The key setting information for right-handedness is setting information in a case in which the case 10 is set as illustrated in FIGS. 4A and 4B.

The key setting information for left-handedness is setting information in a case in which the case 10 is set as illustrated in FIGS. 5A and 5B.

The key setting information for right-handedness and the key setting information for left-handedness are different in the key array of the keypad 131. The key setting information for left-handedness reproduces the key array of the keypad 131 and the functions allocated to the keys of the key setting for right-handedness on the keypad 131 after the case 10 is turned upside down. In the key setting information for left-handedness, for example, operation instruction contents associated with the respective keys in the key setting information for right-handedness are associated with keys located in a symmetrical positional relation with the keys with which the operation instruction contents are associated in the key setting information for right-handedness. For example, in a use state for right-handedness illustrated in FIG. 4B, operation instruction content received by a key K1 at the upper right corner portion is received by a key K2 at the lower left corner portion illustrated in FIG. 5B in a use state for left-handedness.

The main body 12 and the cover 13 include the third terminals 124, the side key 125, the fourth terminal 126, and the keypad 131. The keypad 131 is connected to the third terminals 124. The side key 125 is connected to the fourth terminal 126.

The third terminals 124 and the fourth terminal 126 are electrically connected to the second terminals 115 at the time of attaching the attachment auxiliary unit 11 to the main body 12. In more detail, the third terminals 124 are connected to one of the second terminals 115a and 115b. The fourth terminal 126 is connected to the other of the second terminals 115a and 115b. When receiving a key operation on the side key 125 and the keypad 131, the third terminals 124 and the fourth terminal 126 input information corresponding to the key operation to the electronic device 20 via the second terminals 115.

On the other hand, the electronic device 20 includes a CPU (Central Processing Unit) 201, a ROM (Read Only Memory) 202, a RAM (Random. Access Memory) 203, memory 204, a wireless communication unit 205, a mobile communication unit 206, a sound input/output unit 207, and a secondary battery 208 in addition to the display 22, the touchpad 23, and the external connection terminal 24 described above.

The CPU 201 controls operation of functional units of the electronic device 20. The ROM 202 stores therein computer programs executed by the CPU 201. The RAM 203 is used as a work area of the CPU 201. The memory 204 is a storage medium such as a flash memory or an SSD. The memory 204 stores computer programs, an operating system, and the like executed by the CPU 201.

The wireless communication unit 205 is a communication interface capable of performing wireless communication such as the Wi-Fi (Wireless Fidelity). The mobile communication unit 206 is a communication interface capable of performing mobile communication of the fourth generation (4G) or the like. The sound input/output unit 207 includes a microphone and a speaker.

The secondary battery 208 accumulates (charges) electric power supplied from the external power supply via the external connection terminal 24. The secondary battery 208 supplies the accumulated electric power to functional units of the electronic device 20.

In the constitution described above, the CPU 201 of the electronic device 20 performs various functions relating to the order entry job by executing the computer programs stored in the memory 117 of the case 10 via the external connection terminal 24.

Operations of the case 10 and the electronic device 20 are described with reference to FIG. 8. FIG. 8 is a sequence chart illustrating operations of the case 10 and the electronic device 20.

If the electronic device 20 is received in the attachment auxiliary unit 11 and the first terminal 114 and the external connection terminal 24 are electrically connected (Act 11), the first terminal 114 enables the electronic device 20 to access the memory 117 (Act 12).

The CPU 201 of the electronic device 20 accesses the memory 117 of the attachment auxiliary unit 11 to read out the computer programs and the setting information stored in the memory 117 (Act 13).

Subsequently, the attachment auxiliary unit 11 is attached to the main body 12. The second terminals 115, the third terminals 124, and the fourth terminal 126 are electrically connected (Act 14). The CPU 201 of the electronic device 20 determines whether the case 10 is set to the form for right-handedness or the form for left-handedness on the basis of a connection state of the second terminals 115, the third terminals 124, and the fourth terminal 126 (Act 15). The CPU 201 of the electronic device 20 applies key setting information for a dominant hand corresponding to a result of the determination in Act 15 (Act 16).

Subsequently, the CPU 201 of the electronic device 20 executes the read-out computer programs (Act 17) to perform various functions relating to the order entry job (Act 18).

Specifically, the CPU 201 of the electronic device 20 executes the first computer program to enable reception of an operation input via the operation unit 112, the side key 125, and the keypad 131 under the key setting information applied in Act 15. The CPU 201 of the electronic device 20 further executes the second computer program to connect the wireless communication unit 205 to the intranet in the store. The CPU 201 of the electronic device 20 executes the third computer program display a GUI for order entry on the display 22. The CPU 201 of the electronic device 20 executes the fourth computer program to stop the functional units such as the mobile communication unit 206 unnecessary for the order entry job.

According to the processing described above, in the electronic device 20, the front keys 112a, the side key 125, and the keypad 131 provided in the case 10 can be used as input devices. Consequently, an input of a menu and the like received from a customer can be performed by key operation of the front keys 112a, the side key 125, and the keypad 131. Therefore, the order entry job can be performed easily and efficiently compared with an operation method for inputting menus while switching menu screens from one to another. The case 10 and the electronic device 20 can be used in the same manner as a dedicated terminal (handy terminal) for order entry as long as the electronic device 20 is received in the case 10.

The case 10 stores the computer programs and the setting information relating to the order entry job and provides the computer programs and the setting information to the electronic device 20 in such a way that the computer programs and the setting information can be readable by the electronic device 20. Therefore, the electronic device 20 can easily and efficiently perform preparation for the order entry job. The case 10 can perform a display function of a GUI such as a menu and a communication function with the intranet in the store through the electronic device 20. Therefore, manufacturing cost of the device for order entry job can be reduced compared with a dedicated terminal for the order entry job. The case 10 can disable functions unnecessary for the order entry job among the functions furnished in the electronic device 20. For example, the electronic device 20 for general use such as a smartphone carried by an employee can be effectively utilized.

The case 10 can switch the arrangement position and the key array of the keypad 131 for right-handedness with respect to the main body 12 to that for left-handedness and vice versa. Therefore, the electronic device 20 can be used as a handy terminal easy to use for not only a right-handed user but also a left-handed user. Further, irrespective of whether the case 10 is set to the form for right-handedness or the form for left-handedness, the side key 125 can be located above the center of the case 10 in the longitudinal direction. Therefore, a large portion of the main body 12 which is grasped can be secured. Consequently, the user can operate the electronic device 20 and the various operation keys in a stable state. Operability of the electronic device 20 can be improved.

In the present embodiment described above, the second side surface section 122b of the main body 12 is structured to be rotatable (turnable). However, the second side surface section 122b is not limited to the structure described above as long as positions of both end portions of the second side surface section 122b can be interchanged from one to another and vice versa. For example, the second side surface section 122b may be detachable to the main body 12 to enable positions of both end portions of the second side surface section 122b to be interchanged from one to another and vice versa.

In the present embodiment, the attachment auxiliary unit 11 includes the operation unit 112. However, the operation unit 112 may be removed from the attachment auxiliary unit 11. In the embodiment, the attachment auxiliary unit 11 includes the memory 117. However, the main body 12 or the cover 13 may include the memory 117.

In the present embodiment, the CPU 201 of the electronic device 20 reads out and executes the computer programs stored in the case 10. However, the CPU 201 of the electronic device 20 is not limited to the above constitution. Specifically, the CPU 201 of the electronic device 20 may install the computer programs read out from the memory 117 of the case 10 to the electronic device 20 to store the computer programs in the memory 204 of the electronic device 20. In this case, for example, the CPU 201 of the electronic device 20 installs or copies the computer programs and the setting information stored in the memory 117 of the case 10 in the memory 204 of the electronic device 20 at the time of the initial connection with the case 10. Further, at the time of the next and subsequent connection with the case 10, the CPU 201 of the electronic device 20 refers to versions of the computer programs and the setting information stored in the memory 117 of the case 10 and may update the versions if the versions thereof stored in the memory 117 are newer than versions thereof installed in the electronic device 20.

In the present embodiment, the keypad 131 is composed of a hardware key. However, the keypad 131 is not limited to this. The keypad 131 may be a software key, for example, using an electronic paper or touch panel technique.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A case comprising:
   a main body including a first side portion, a second side portion, and a recessed portion between the first and second side portions,
   the second side portion being positionable at a first position at which a longitudinal end of the second side portion is aligned with a first longitudinal end of the first side portion and at a second position at which the longitudinal end of the second side portion is aligned with a second longitudinal end of the first side portion, and
   the recessed portion being configured to receive, therein, a portable electronic device having a display screen on a front surface thereof, such that the display screen is exposed;
   a cover rotatably attached to the first side portion of the main body and configured to cover the front surface of the portable electronic device in the recessed portion when the cover is at a closed position;
   a first operation unit on a surface of the cover that faces the front surface of the portable electronic device in the recessed portion when the cover is at the closed position, the first operation unit configured to cause a first operation signal corresponding to a first user operation of the first operation unit to be transmitted to the portable electronic device; and
   a second operation unit on an outer surface of the second side portion, the second operation unit configured to cause a second operation signal corresponding to a second user operation of the second operation unit to be transmitted to the portable electronic device.

2. The case according to claim 1, wherein the second operation unit is at a position offset to a longitudinal end of the second side portion from a center of the second side portion.

3. The case according to claim 1, wherein
   the recessed portion of the main body is configured to receive the portable electronic device both in a first orientation in which a longitudinal surface of the portable electronic device faces the first side portion, and in a second orientation in which the longitudinal surface of the portable electronic devices faces the second side portion.

4. The case according to claim 1, further comprising:
   an attachment auxiliary unit having a reception portion in which the portable electronic device having the exposed display screen on the front surface thereof fits, and configured to fit in the recessed portion of the main body with the portable electronic device in the reception portion.

5. The case according to claim 4, wherein
   the reception portion of the attachment auxiliary unit is configured to fit in the recessed portion of the main body both in a first orientation in which a side surface of the attachment auxiliary unit faces the first side portion, and in a second orientation in which the side surface of the attachment auxiliary unit faces the second side portion.

6. The case according to claim 5, wherein
   the first side portion of the main body includes a first connection interface and a second connection interface,
   the second side portion of the main body includes a third connection interface,
   the attachment auxiliary unit includes a fourth connection interface connectable to the first and third connection interfaces, and a fifth connection interface connectable to the second and the third connection interfaces.

7. The case according to claim 6, wherein
   when the attachment auxiliary unit is in the first orientation in the recessed portion of the main body and the second side portion of the main body is at the first position, the first connection interface is connected to the fourth connection interface, and the third connection interface is connected to the fifth connection interface, and
   when the attachment auxiliary unit is in the second orientation in the recessed portion of the main body and the second side portion of the main body is at the second position, the second connection interface is connected to the fifth connection interface, and the third connection interface is connected to the fourth connection interface.

8. The case according to claim 6, wherein
   the first and second connection interfaces are configured to interface the first operation unit, and
   the third connection interface is configured to interface the second operation unit.

9. The case according to claim 4, further comprising:
   a third operation unit on an outer surface of the attachment auxiliary unit, the third operation unit configured to cause a third operation signal corresponding to a third user operation of the second operation unit to be transmitted to the portable electronic device.

10. The case according to claim 1, wherein the second side portion of the main body is rotatable around a rotational axis between the first position and the second position.

11. The case according to claim 1, further comprising:
    a memory device storing first operational setting data corresponding to the second side portion at the first position and second operational setting data corresponding to the second side portion at the second position.

12. An electronic device system comprising:
    a portable electronic device having a display screen on a front surface thereof and a connection terminal; and
    a case comprising:
    a main body including a first side portion, a second side portion, and a recessed portion between the first and second side portions,
    the second side portion being positionable at a first position at which a longitudinal end of the second side portion is aligned with a first longitudinal end of the first side portion and at a second position at which the longitudinal end of the second side portion is aligned with a second longitudinal end of the first side portion, and
    the recessed portion being configured to receive, therein, the portable electronic device, such that the display screen is exposed;
    a cover rotatably attached to the first side portion of the main body and configured to cover the front surface of the portable electronic device in the recessed portion when the cover is at a closed position;
    a first operation unit on a surface of the cover that faces the front surface of the portable electronic device in the recessed portion when the cover is at the closed position, the first operation unit configured to cause a first operation signal corresponding to a first user operation of the first operation unit to be transmitted to the portable electronic device through the connection terminal; and a second operation unit on an outer surface of the second side portion, the second operation unit configured to cause a second operation signal corresponding to a second user operation of the second operation unit to be transmitted to the portable electronic device through the connection terminal.

13. The electronic device system according to claim 12, wherein the portable electronic device further includes a controller configured to determine whether the second side portion of the main body of the case is at the first position or at the second position, and operate in a first mode when the second side portion of the main body is determined to be at the first position, and in a second mode when the second side portion of the main body is determined to be at the second position.

14. The electronic device system according to claim 13, wherein the case further includes:

an attachment auxiliary unit having a reception portion in which the portable electronic device having the exposed display screen on the front surface thereof fits, and configured to fit in the recessed portion of the main body with the portable electronic device in the reception portion.

15. The electronic device system according to claim 14, wherein the reception portion of the attachment auxiliary unit is configured to fit in the recessed portion of the main body both in a first orientation in which a side surface of the attachment auxiliary unit faces the first side portion, and in a second orientation in which the side surface of the attachment auxiliary unit faces the second side portion.

16. The electronic device system according to claim 15, wherein the first side portion of the main body includes a first connection interface and a second connection interface, the second side portion of the main body includes a third connection interface, the attachment auxiliary unit includes a fourth connection interface connectable to the first and third connection interfaces, and a fifth connection interface connectable to the second and the third connection interfaces.

17. The electronic device system according to claim 16, wherein the controller of the portable electronic device determines whether the second side portion of the main body of the case is at the first position or at the second position, at least based on connection of the first connection interface with the fourth interface or connection of the second connection interface with the fifth connection interface.

18. The electronic device system according to claim 16, wherein the controller of the portable electronic device determines whether the second side portion of the main body of the case is at the first position or at the second position, at least based on connection of the third interface with the fifth connection interface or with the fourth connection interface.

19. The electronic device system according to claim 13, wherein the first operation unit includes a first key and a second key at a diagonal position of the first key, and the controller of the portable electronic device is configured to detect an operation in response to an operation of the first key during the first mode, and detect the operation in response to an operation of the second key during the second mode.

20. The electronic device system according to claim 12, wherein the case further comprises a battery mount on which a battery is mountable, and power from the battery is transmittable to the portable electronic device through the connection terminal.

* * * * *